(12) United States Patent
Lin et al.

(10) Patent No.: US 8,480,284 B2
(45) Date of Patent: Jul. 9, 2013

(54) LIGHT GUIDE UNIT AND LIGHT SOURCE MODULE HAVING SCATTERING REFLECTIVE UNIT

(75) Inventors: Sheng-Hung Lin, Hsin-Chu (TW);
Jung-Min Hwang, Hsin-Chu (TW);
Shih-Yuan Yu, Hsin-Chu (TW);
Ching-Yuan Chung, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 190 days.

(21) Appl. No.: 13/100,291

(22) Filed: May 3, 2011

(65) Prior Publication Data

US 2012/0026751 A1    Feb. 2, 2012

(30) Foreign Application Priority Data

Jul. 27, 2010  (TW) .............................. 99124789 A

(51) Int. Cl.
*F21V 8/00*            (2006.01)
(52) U.S. Cl.
USPC .......................................... 362/611; 362/621
(58) Field of Classification Search
CPC .. H01L 33/58; G02B 6/002; G02B 6/55; F21K 9/00
USPC ................ 362/235, 611, 609; 349/57, 62–63
See application file for complete search history.

(56) References Cited

U.S. PATENT DOCUMENTS

| | | | |
|---|---|---|---|
| 6,648,485 B1 | 11/2003 | Colgan et al. | |
| 2004/0085748 A1* | 5/2004 | Sugiura | 362/31 |
| 2007/0159848 A1* | 7/2007 | Yang et al. | 362/608 |
| 2007/0216992 A1 | 9/2007 | Tzeng et al. | |
| 2010/0165658 A1* | 7/2010 | Huang et al. | 362/606 |
| 2010/0232139 A1* | 9/2010 | Lin | 362/97.1 |
| 2010/0302801 A1* | 12/2010 | Lin et al. | 362/606 |
| 2011/0019437 A1* | 1/2011 | Liao | 362/615 |

FOREIGN PATENT DOCUMENTS

| | | |
|---|---|---|
| TW | 588804 | 5/2004 |
| TW | 594074 | 6/2004 |
| TW | 594248 | 6/2004 |
| TW | I247142 | 1/2006 |
| TW | I253524 | 4/2006 |
| TW | 200617559 | 6/2006 |
| TW | M292707 | 6/2006 |
| TW | M294655 | 7/2006 |
| TW | M312679 | 5/2007 |
| TW | M315841 | 7/2007 |
| TW | M317584 | 8/2007 |
| TW | I287667 | 10/2007 |
| TW | M331680 | 5/2008 |
| TW | M332206 | 5/2008 |

* cited by examiner

*Primary Examiner* — Tracie Y Green
(74) *Attorney, Agent, or Firm* — Jianq Chyun IP Office

(57) ABSTRACT

A light guide unit including a light guide plate and a scattering reflective unit is provided. The light guide plate has a first surface, a second surface opposite to the first surface, and a light incident surface connecting the first surface and the second surface. The light incident surface includes a first recess and a second recess arranged in a sequence from the first surface to the second surface. An average radius of curvature of the first recess is less than an average radius of curvature of the second recess. The scattering reflective unit is disposed on the second surface. A light source module is also provided.

20 Claims, 8 Drawing Sheets

LIGHT GUIDE UNIT AND LIGHT SOURCE MODULE HAVING SCATTERING REFLECTIVE UNIT

CROSS-REFERENCE TO RELATED APPLICATION

This application claims the priority benefit of Taiwan application serial no. 99124789, filed Jul. 27, 2010. The entirety of the above-mentioned patent application is hereby incorporated by reference herein and made a part of this specification.

BACKGROUND OF THE DISCLOSURE

1. Field of Invention

The invention generally relates to an optical device and a light source using the same, and more particularly, to a light guide unit and a light source module using the same.

2. Description of Related Art

In a conventional side incident type light source module, a light guide plate is used to guide a light beam emitted from a light emitting device disposed on a side surface of the light guide plate towards a front surface of the light guide plate, so as to form a uniform surface light source. For the light beam entering the light guide plate through the side surface thereof, since an incident angle of the light beam transmitted to the front surface and the back surface of the light guide plate is larger than the critical angle, the light beam is continuously totally reflected by the front and back surfaces of the light guide plate, and thus the light beam is restricted within the light guide plate.

In order to guide the light beam towards the front surface of the light guide plate, conventional techniques typically dispose optical microstructures on at least one of the front and back surfaces of the light guide plate so as to disrupt the total internal reflection phenomenon of the light beam, and thereby the light beam may be emitted from the front surface of the light guide plate. However, the position, quantity, and size of the optical microstructures typically require a finely tuned design and a suitable configuration in order for the light source module to provide a uniform surface light source. The design process is generally referred to as an optical distribution design. For example, Taiwan Patent Nos. 594074, I247142, and I287667 disclose light guide plates using microstructures to achieve the effect of a uniform light source.

One of the main reasons why an optical distribution design poses additional complexities and challenges is the minuscule dimensions of the optical microstructures (e.g., on the micrometer scale). Therefore, designing with an optical modeling software results in more errors, and the optical modeling requires a long period of time. Moreover, a scattering model of the optical microstructures is non-trivial to establish, and additional modeling errors are introduced when the quantity of the optical microstructures is too numerous. In order to overcome these errors, conventional design techniques typically perform design modifications according to the experience gained from empirical trials. Typically, three to five tests are needed to obtain an uniform surface light source. Moreover, a typical optical microstructure design employs a quantity of microstructures in the thousands, hence variables in such a design are hard to handle. The afore-described design complexities easily increase work hours, and therefore increase a manufacturing cost.

Taiwan Patent Nos. M312679, M332206, M317584, M292707, M294655, Taiwan Patent Publication No. 200617559, and U.S. Pat. No. 6,648,485 disclose a side of a light guide plate having a plurality of recess structures or protruding structures. Moreover, Taiwan Patent Nos. I253524, 594248, and M315841 disclose methods of displacing a light source. Further, Taiwan Patent Nos. 588804 and M331680 disclose disposing lenses on a light incident surface of a light guide plate.

SUMMARY OF THE INVENTION

Accordingly, the invention is directed to a light guide unit, the light guide unit is easily designed, and a manufacturing cost is low.

The invention is directed to a light source module, the light source module is easily designed, a manufacturing cost is low, and the light source module is formed into a uniform light source.

Other objects and advantages of the invention may be further illustrated by the technical features broadly embodied and described as follows.

In order to achieve one or a portion of or all of the objects or other objects, one embodiment of the invention is directed to a light guide unit, including a light guide plate and a scattering reflective unit. The light guide plate has a first surface, a second surface opposite to the first surface, and a light incident surface connecting the first surface and the second surface. The light incident surface includes a first recess and a second recess arranged in a sequence from the first surface to the second surface. Moreover, an average radius of curvature of the first recess is less than an average radius of curvature of the second recess. The scattering reflective unit is disposed on the second surface.

Another embodiment of the invention provides a light source module including the aforesaid light guide unit and at least one light emitting device. The light emitting device is disposed beside the light incident surface and capable of emitting a light beam. The light beam enters the light guide unit through the light incident surface, and the light beam is transmitted out of the light guide unit through the first surface.

In summary, the embodiments of the invention may achieve at least one of the following advantages. In the light guide unit and the light source module according to the embodiments of the invention, the light incident surface of the light guide plate includes a first recess and a second recess arranged in a sequence from the first surface to the second surface. Moreover, the average radius of curvature of the first recess is less than the average radius of curvature of the second recess. Further, with the scattering reflective unit added, the light guide unit may uniformly guide an incident light outwards. As such, the light source module may provide a uniform surface light source. Accordingly, the light guide unit and the light source module of the embodiments of the invention do not require an overly complex optical distribution design in order to provide the uniform surface light source. Therefore, the light guide unit and the light source module have a lower manufacturing cost.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
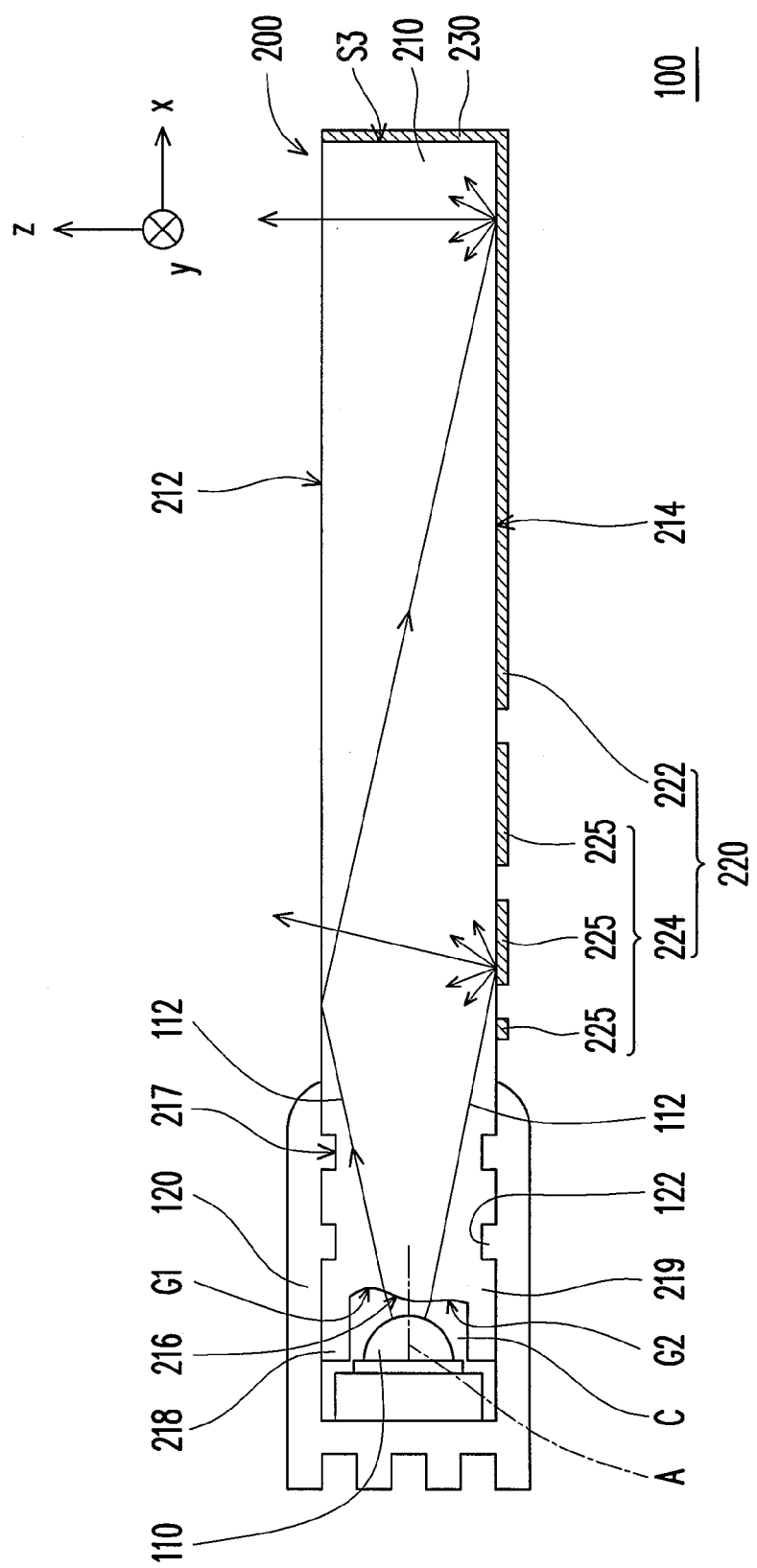
FIG. 1A is a schematic cross-sectional view of a light source module according to an embodiment of the invention.
Figure 1B:
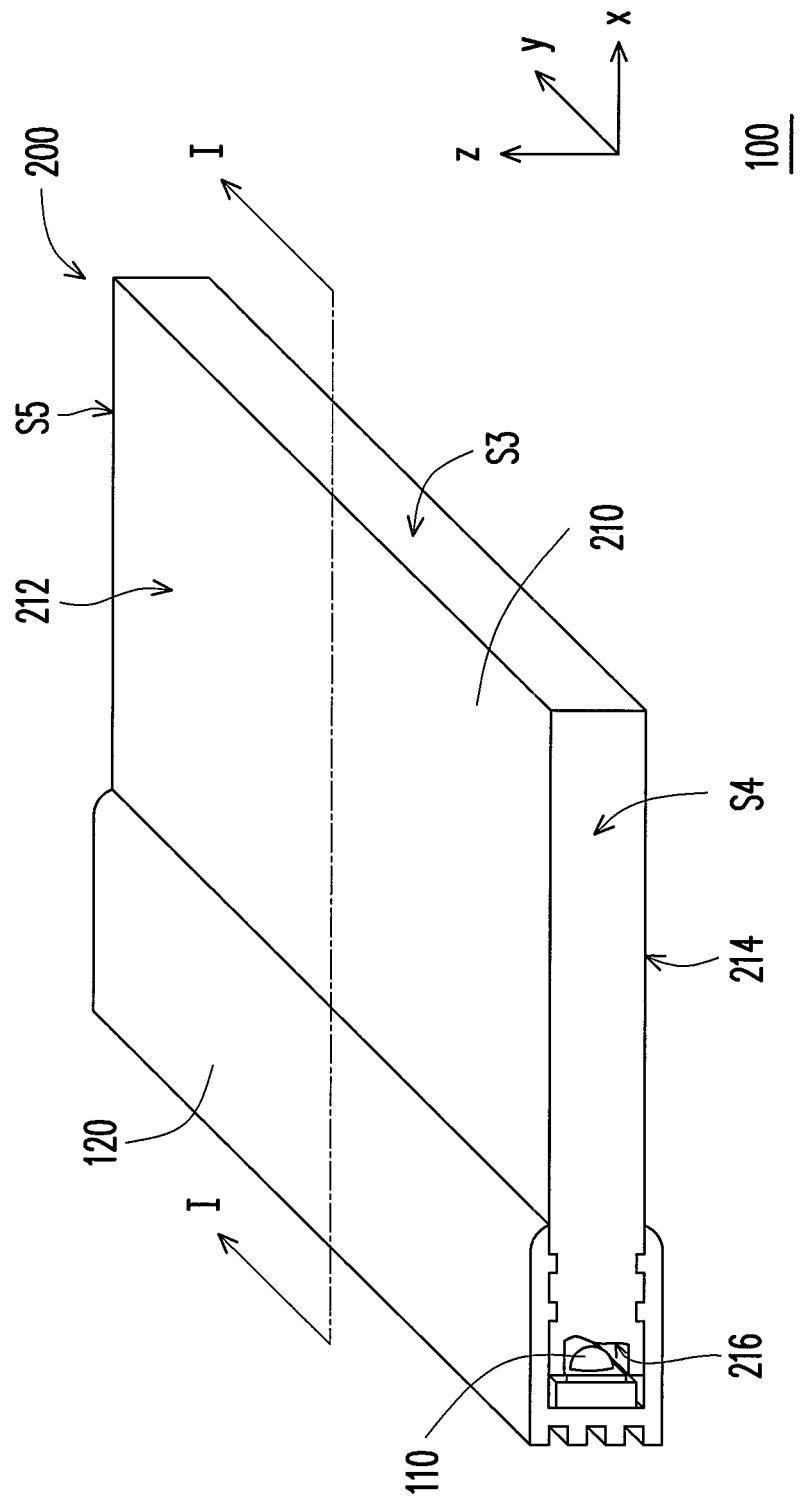
FIG. 1B is a schematic solid diagram of the light source module depicted in FIG. 1A.
Figure 2:
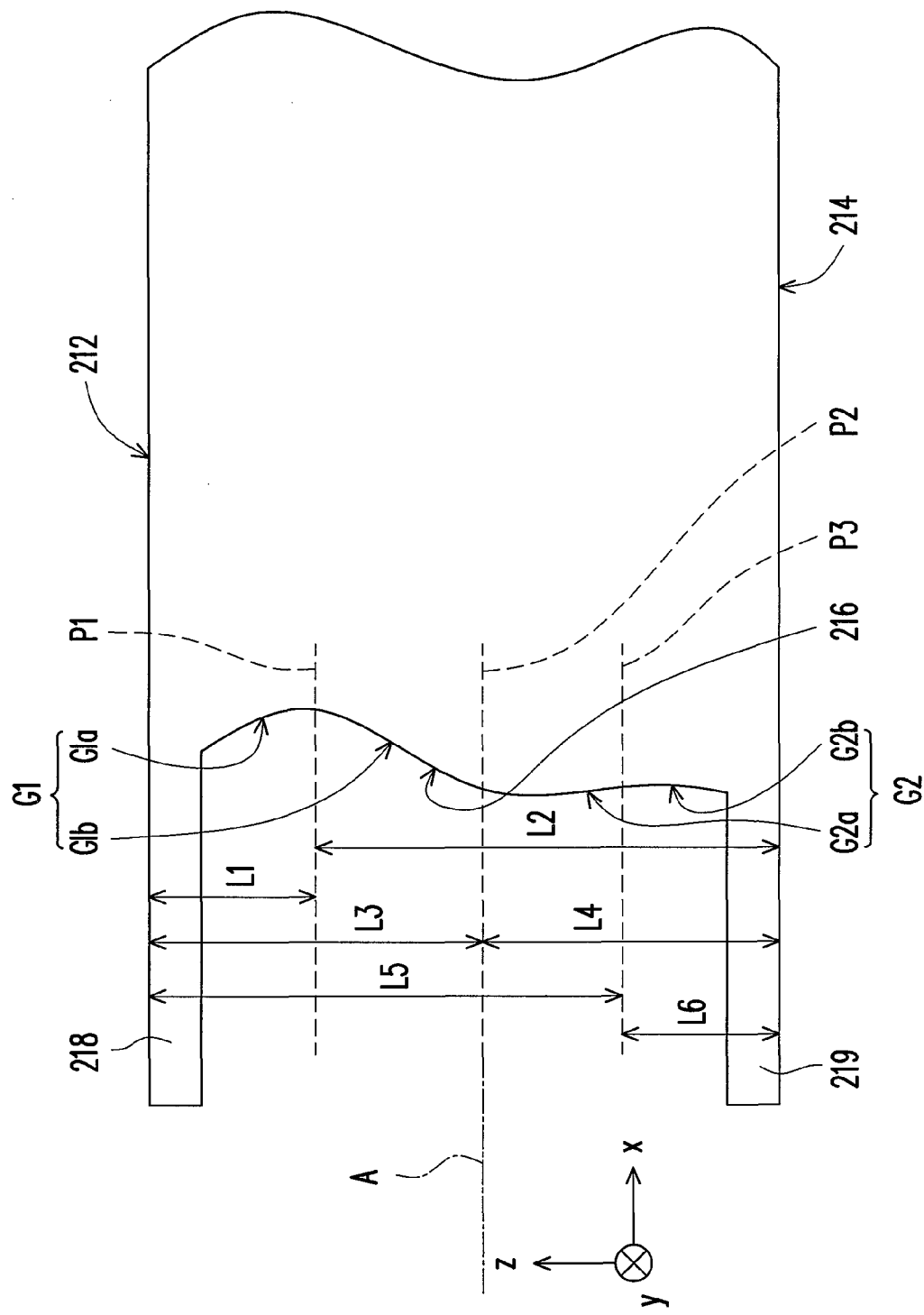
FIG. 2 is an enlarged view near a light incident surface of a light guide plate depicted in FIG. 1A.
Figure 3:
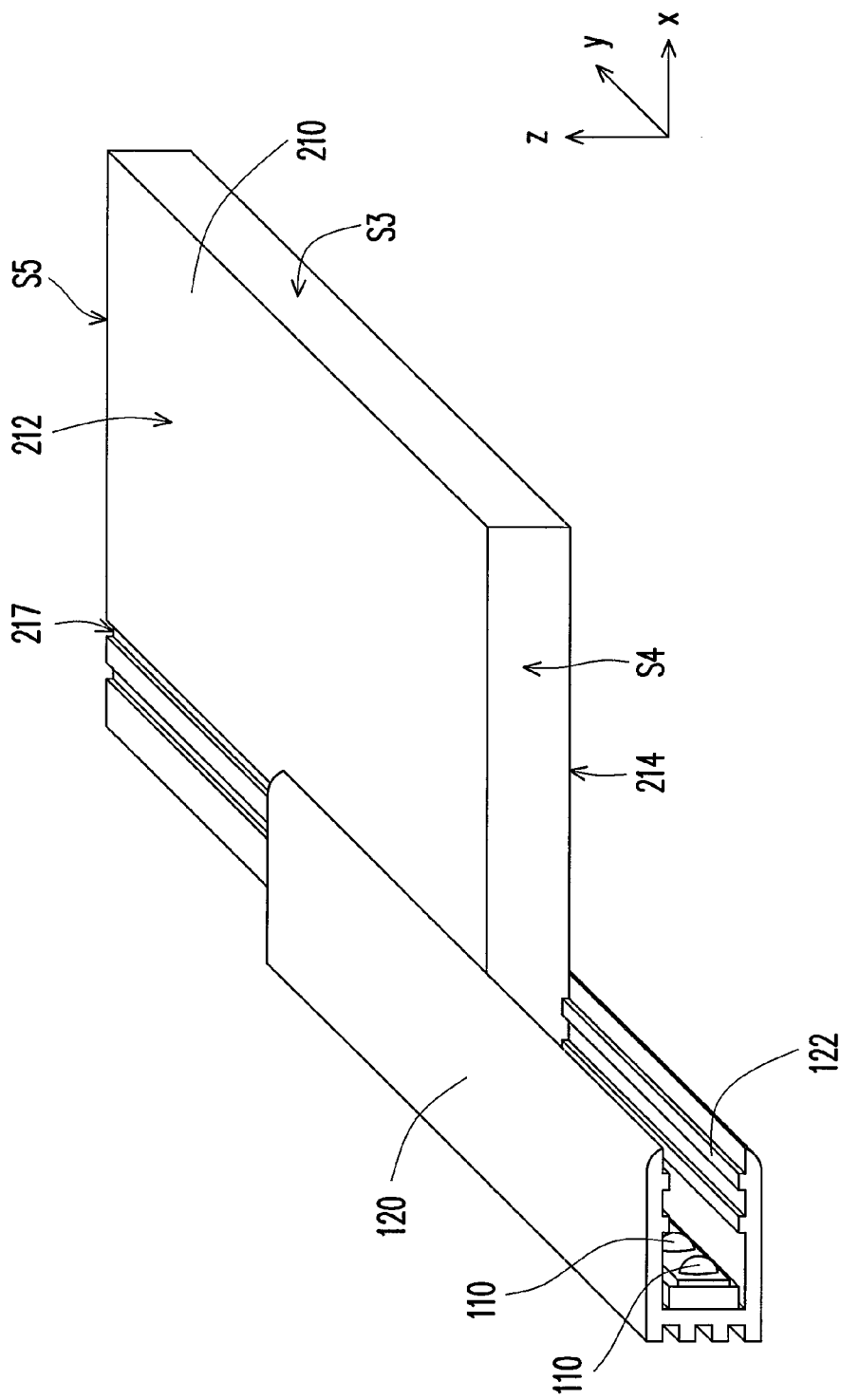
FIG. 3 illustrates an assembly process of the light source module depicted in FIG. 1A.

FIG. 1A is a schematic cross-sectional view of a light source module according to an embodiment of the invention. FIG. 1B is a schematic solid diagram of the light source module depicted in FIG. 1A. FIG. 2 is an enlarged view near a light incident surface of a light guide plate depicted in FIG. 1A. FIG. 3 illustrates an assembly process of the light source module depicted in FIG. 1A. Moreover, FIG. 1A is a schematic cross-sectional view of the light source module depicted in FIG. 1B along a I-I line. In FIGS. 1B and 3, a reflective unit is omitted in order to make the figures more comprehensible. Referring to FIGS. 1A, 1B, and 2, a light source module 100 of the embodiment includes a light guide unit 200. The light guide unit 200 includes a light guide plate 210. The light guide plate 210 has a first surface 212, a second surface 214 opposite to the first surface 212, and a light incident surface 216 connecting the first surface 212 and the second surface 214. The light incident surface 216 includes a first recess G1 and a second recess G2 arranged in a sequence from the first surface 212 to the second surface 214, and an average radius of curvature of the first recess G1 is less than an average radius of curvature of the second recess G2.

In the embodiment, an extended direction of the light incident surface 216 is, for example, substantially parallel to a y-direction depicted in the figures. Moreover, the first surface 212 and the second surface 214 are, for example, substantially perpendicular to a z-direction, or in other words substantially parallel to an x-y plane, and the x, y, and z-directions are perpendicular to each other.

Further, in the embodiment, the first recess G1 and the second recess G2 are each a strip-shaped groove extending along a direction substantially parallel to the second surface 214. In other words, in the embodiment, the light incident surface 216 does not curve in the y-direction. In the z-direction, the light incident surface 216 curves into two recesses (e.g., the first recess G1 and the second recess G2).

The light source module 100 further includes at least one light emitting device 110. In the embodiment, a plurality of light emitting devices 110 is used as an example, and the light emitting devices 110 are arranged along the y-direction, as shown in FIG. 3. The light emitting devices 110 are disposed beside the light incident surface 216 and capable of emitting a light beam 112. The light beam 112 enters the light guide unit 200 through the light incident surface 216, and the light beam 112 is transmitted out of the light guide unit 200 through the first surface 212. In the embodiment, each of the light emitting devices 110 is a light emitting diode (LED), for example. However, in other embodiments of the invention, a cold cathode fluorescent lamp (CCFL) or other suitable light emitting devices may be employed to replace the LEDs, and the CCFL extends along the y-direction, for example.

Specifically, in the embodiment, the light guide unit 200 further includes a scattering reflective unit 220 disposed on the second surface 214. In the embodiment, the scattering reflective unit 220 includes a continuous scattering reflective layer 222. The continuous scattering reflective layer 222 is, for example, a continuous white reflective layer which diffuses and reflects the light beam 112 towards the first surface 212. Thereby, the light beam 112 is transmitted out of the light guide unit 200 through the first surface 212.

Moreover, in the embodiment, the scattering reflective unit 220 further includes a patterned scattering reflective layer 224 disposed between an end of the second surface 214 near the light incident surface 216 and the continuous scattering reflective layer 222. Further, the patterned scattering reflective layer 224 includes a plurality of scattering reflective patterns 225 separated from each other. In the embodiment, the scattering reflective patterns 225 are, for example, white reflective patterns which diffuse and reflect the light beam 112 towards the first surface 212. Thereby, the light beam 112 is transmitted out of the light guide unit 200 through the first surface 212. Moreover, in the embodiment, each of the scattering reflective patterns 225 extends, for example, along the y-direction, and the scattering reflective patterns 225 are arranged along the x-direction. Further, an area of the scattering reflective patterns 225 may be progressively increased from near the light incident surface 216 to away from the light incident surface 216. For example, the lengths of the scattering reflective patterns 225 on the y-direction may be the same, for example. On the x-direction, the widths of the scattering reflective patterns 225 may be progressively increased from near the light incident surface 216 to away from the light incident surface 216.

Moreover, the light beam 112 directly transmitted to the first surface 212 from the light incident surface 216 may be totally reflected by the first surface 212 and transmitted to the scattering reflective unit 220. The scattering reflective unit 220 diffuses the light beam 112 towards the first surface 212, and thereby the light beam 112 is transmitted out of the light guide unit 200 through the first surface 212.

When the scattering reflective unit 220 diffuses the light beam 112 towards the first surface 212, the light source module 100 forms a uniform surface light source on the first surface 212. Further, with a design having the area of the scattering reflective patterns 225 progressively increasing from near the light incident surface 216 to away from the light incident surface 216, the uniformity of the surface light source is facilitated. However, in other embodiments of the invention, the scattering reflective unit 220 may also be a sheet of continuous scattering reflective layer, whose coverage of the second surface 214 may include the range of the afore-described continuous scattering reflective layer 222 and the range of the patterned scattering reflective layer 224.

In the embodiment, the first recess G1 and the second recess G2 are each a smoothly curved recess. Additionally, in the embodiment, the first recess G1 is asymmetrical on the direction perpendicular to the first surface 212 (e.g., the z-direction), and the second recess G2 is asymmetrical on the direction perpendicular to the first surface 212. In other words, when the z-direction is viewed as an upwards direction, the upper and lower portions of the first recess G1 are asymmetrical and the upper and lower portions of the second recess G2 are asymmetrical.

More specifically, in the embodiment, the first recess G1 includes a first portion G1a and a second portion G1b, and the second recess G2 includes a third portion G2a and a fourth portion G2b. The first portion G1a is disposed between the first surface 212 and a first reference plane P1. A distance L1 from the first reference plane P1 to the first surface 212 divided by a distance L2 from the first reference plane P1 to the second surface 214 is substantially equal to ⅓. In the embodiment, the first reference plane P1 is substantially parallel to the first surface 212 and the second surface 214. The second portion G1b is disposed between the first reference plane P1 and a second reference plane P2. A distance L3 from the second reference plane P2 to the first surface 212 divided by a distance L4 from the second reference plane P2 to the second surface 214 is substantially equal to 1. In the embodiment, the second reference plane P2 is substantially parallel to the first surface 212 and the second surface 214.

The third portion G2a is disposed between the second reference plane P2 and a third reference plane P2. A distance L5 from the third reference plane P3 to the first surface 212 divided by a distance L6 from the third reference plane P3 to the second surface 214 is substantially equal to 3. In the embodiment, the third reference plane P3 is substantially parallel to the first surface 212 and the second surface 214. The fourth portion G2b is disposed between the third reference plane P3 and the second surface 214. In the embodiment, the second portion G1b connects the first portion G1a and the third portion G2a, and the third portion G2a connects the second portion G1b and the fourth portion G2b. Moreover, in the embodiment, an average radius of curvature of the first portion G1a is less than an average radius of curvature of the second portion G1b. The average radius of curvature of the second portion G1b is less than an average radius of curvature of the third portion G2a. Further, the average radius of curvature of the third portion G2a is less than an average radius of curvature of the fourth portion G2b. In the embodiment, the radius of curvature refers to a radius of curvature of a plane parallel to the x-z plane.

In another embodiment of the invention, the second surface 214 is not parallel to the first surface 212, but the first reference plane P1, the second reference plane P2, and the third reference plane P3 are still parallel to the first surface 212. Under this circumstance, the distance from the first reference plane P1 to the second surface 214 is defined as an average value of different distances from the first surface plane P1 to the second surface 214, and perpendicular to the first reference plane P1. Likewise, the distances from the second reference plane P2 and the third reference plane P3 to the second surface 214 may be defined in a similar manner, and therefore the description is omitted herein.

In the embodiment, the light guide plate 210 also has a third surface S3, a fourth surface S4 (e.g., illustrated in FIG. 1B), and a fifth surface S5 (e.g., illustrated in FIG. 1B, the surface blocked by the light guide plate 210 and facing away from the fourth surface S4). The third surface S3 connects the first surface 212 and the second surface 214, and the third surface S3 is opposite to the light incident surface 216. The fourth surface S4 connects the first surface 212 and the second surface 214, and the fourth surface S4 also connects the light incident surface 216 and the third surface S3. The fifth surface S5 connects the first surface 212 and the second surface 214, and the fifth surface S5 also connects the light incident surface 216 and the third surface S3. Moreover, the fifth surface S5 is opposite to the fourth surface S4.

In the embodiment, the light guide unit 200 may further have at least one reflective unit 230 disposed on at least one of the third surface S3, the fourth surface S4, and the fifth surface S5. For example, the reflective unit 230 may be disposed on the third surface S3, the fourth surface S4, and the fifth surface S5. Moreover, the reflective unit 230 is, for example, a scattering reflective layer. The scattering reflective layer may be a white reflective layer, for example, which diffuses the light beam 112. In the embodiment, the reflective unit 230 and the scattering reflective unit 220 may be integrally formed. However, in other embodiments of the invention, the reflective unit 230 and the scattering reflective unit 220 may also be formed separately. Additionally, in other embodiments, the reflective unit 230 may also be a mirror reflective layer, such as a silver reflective layer which approximates the law of reflection when reflecting the light beam 112. The law of reflection refers to an incident angle being equal to a reflected angle.

In the embodiment, the light emitting devices 110 have an optical axis A (referring concurrently to FIGS. 1A and 2), and the optical axis A and the second reference plane P2 substantially overlap each other (referring to FIG. 2). In other words, when the second reference plane P2 is extended to infinity, the optical axis A substantially falls on the second reference plane P2.

In the embodiment, the curvature of the first recess G1 is mainly responsible to process the light beam 112 from the light emitting devices 110 having an emergent angle from approximately +10 degrees to +40 degrees. The curvature of the second recess G2 is mainly responsible to process the light beam 112 from the light emitting devices 110 having an emergent angle from approximately −10 degrees to −40 degrees. Moreover, an emergent angle of the light beam 112 transmitted on the optical axis A is defined as 0 degrees. An emergent angle deviating from the optical axis A towards the +z-direction has a positive value, whereas an emergent angle deviating from the optical axis A towards the −z-direction has a negative value. The curvature design of the first recess G1 and the second recess G2 may evenly distribute the light beam 112 on the scattering reflective unit 220. After the scattering effect of the scattering reflective unit 220, the light guide unit 200 may uniformly guide out the incident light beam 112 from the first surface 212, so as to form a uniform surface light source. Accordingly, the light guide unit 200 and the light source module 100 of the embodiment do not require an overly complex optical distribution design in order to provide the uniform surface light source. Therefore, the light guide unit 200 and the light source module 100 have a lower manufacturing cost.

Moreover, the light guide unit 200 of the embodiment may be manufactured by a double extrusion molding process. Specifically, materials of several different colors (e.g., colorless and white) are integrally extruded along the y-direction to form the light guide unit 200. The colorless material forms the light guide plate 210, whereas the white material forms the scattering reflective unit 220. The double extrusion molding has a simpler manufacturing process, therefore lowering a manufacturing cost of the light guide unit 200 and the light source module 100. Additionally, when the width of the light guide plate 210 on the x-direction is determined, the curvatures of the first recess G1 and the second recess G2 on the plane parallel to the x-z plane needs to be determined before completing most of the design. In other words, an effect of the length of the light guide unit 200 on the y-direction does not need to be considered. As long as the curvature of the first recess G1 and the curvature of the second recess G2 are well designed, no matter how long the length of the light guide unit 200 is extruded on the y-direction, the surface light source may be made uniform. Therefore, the light guide unit 200 and the light source module 100 of the embodiment are easy to design, and the length of the light guide unit 200 on the y-direction may be freely altered according to actual requirements.

In the embodiment, the light guide plate 210 includes a first protruding portion 218 and a second protruding portion 219. The first protruding portion 218 is disposed on an intersection of the first surface 212 and the first recess G1, and the second protruding portion 219 is disposed on an intersection of the second surface 214 and the second recess G2. The first protruding portion 218, the first recess G1, the second recess G2, and the second protruding portion 219 form an accommodating space C for accommodating the light emitting devices 110.

Moreover, in the embodiment, the light source module 100 further includes a lampshade 120 covering the light emitting devices 110, a portion of the first surface 212 near the light incident surface 216, the light incident surface 216, and a portion of the second surface 214 near the light incident surface 216. At least one of the first surface 212 and the second surface 214 has at least one first engaging structure 217 thereon (e.g., each of the first surface 212 and the second surface 214 has two first engaging structures 217). An extended direction of the first engaging structures 217 is substantially parallel to the extended direction of the light incident surface 216 (e.g., substantially parallel to the y-direction). The lampshade 120 has at least one second engaging structure 122 corresponding to the first engaging structures 217 (e.g., four second engaging structures 122 depicted in FIG. 1A). An extended direction of the second engaging structures 122 is substantially parallel to the extended direction of the light incident surface 216 (e.g., substantially parallel to the y-direction). Moreover, the second engaging structures 122 and the first engaging structures 217 may engage with each other. In the embodiment, the first engaging structures 217 are trenches, whereas the second engaging structures 122 are strip protrusions. However, in other embodiments of the invention, the first engaging structures 217 may be strip protrusions, whereas the second engaging structures 122 are trenches.

In the embodiment, when the light source module 100 is assembled, the lampshade 120 and the light emitting devices 110 may be pushed along the +y-direction or the −y-direction, such that the second engaging structures 122 are slid into the entire first engaging structures 217 along the y-direction. Moreover, when performing maintenance on the light source module 100, the lampshade 120 and the light emitting devices 110 may be pushed along the +y-direction or the −y-direction, such that the second engaging structures 122 are slid out of the first engaging structures 217, and the lampshade 120 and the light emitting devices 110 may be detached from the light guide unit 200 for maintenance. Accordingly, the light source module 100 according to the embodiment is easy to assemble and convenient to maintain.

Figure 4A:
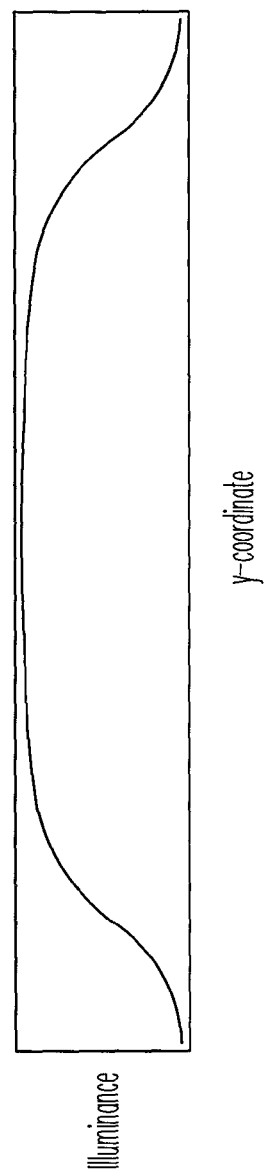
FIGS. 4A and 4B are illuminance distribution diagrams of the surface light source provided by the light source module depicted in FIG. 1A.
Figure 4B:
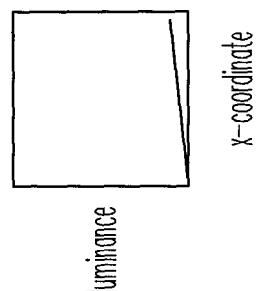

FIGS. 4A and 4B are illuminance distribution diagrams of the surface light source provided by the light source module depicted in FIG. 1A. FIG. 4A illustrates an illuminance distribution along the y-direction, whereas FIG. 4B illustrates an illuminance distribution along the x-direction. As shown in FIGS. 4A and 4B, the light source module 100 according to the embodiment may provide a uniform surface light source.

Figure 5:
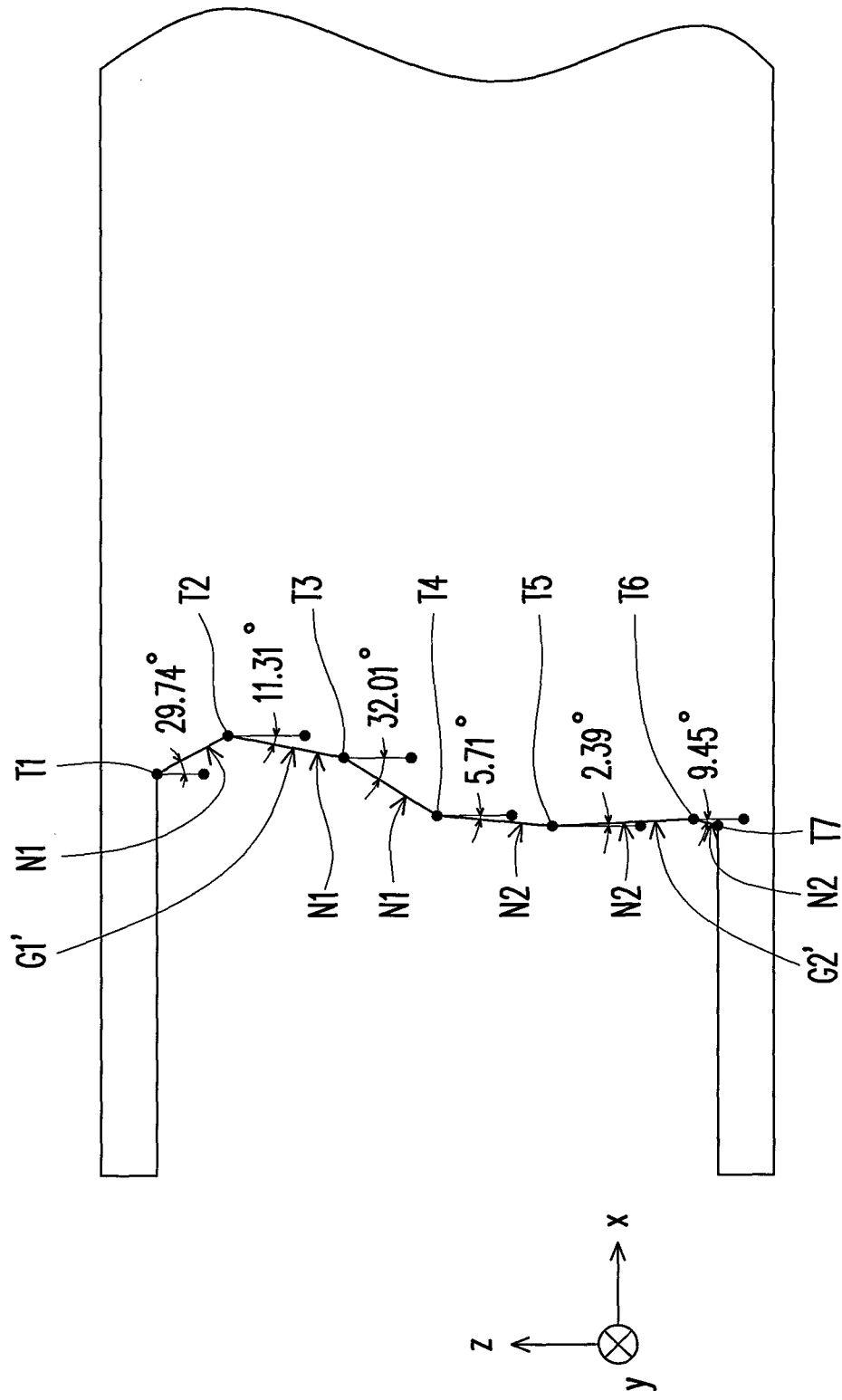
FIG. 5 is an enlarged view near a light incident surface of a light guide plate of a light source module according to another embodiment of the invention.

FIG. 5 is an enlarged view near a light incident surface of a light guide plate of a light source module according to another embodiment of the invention. Referring to FIG. 5, the light source module according to the embodiment is similar to the light source module depicted in FIG. 1A, and a difference between these two light source modules is described hereafter. In the embodiment, the first recess G1' and the second recess G2' are each a curved recess formed by a plurality of planes. The first recess G1' is, for example, a bended recess formed by combining a plurality of planes N1, and the second recess G2' is, for example, a bended recess formed by combining a plurality of planes N2. Moreover, the planes N1 and the planes N2 extend along the y-direction. The average radii of curvature for the first recess G1' and the second recess G2' may be calculated by the following method. On a cross-sectional plane parallel to the x-z plane, form a circumscribed circle using any three neighboring points or ends of the planes N1 and N2, and find the radius of curvature of the circumscribed circle. Thereafter, to obtain the average radius of curvature, take the average value of the radii of curvature for all the circumscribed circles formed by the neighboring points or ends of the first recess G1' and the second recess G2'.

For example, the average radius of curvature for the first recess G1' is the average value of the radius of curvature of the circle passing through a point T1, a point T2, and a point T3, and the radius of curvature of the circle passing through the point T2, the point T3, and a point T4. Moreover, the average radius of curvature for the second recess G2' is the average value of the radius of curvature of the circle passing through the point T4, a point T5, and a point T6, and the radius of curvature of the circle passing through the point T5, the point T6, and a point T7. It should be noted that, the first recess G1' and the second recess G2' are not limited to being formed by three sectional planes, as they may be formed by even more sections of planes or two sections of planes. Moreover, the average radii of curvature thereof may be calculated by a method similar to the afore-described method, and hence no further description is provided hereinafter.

The first recess and the second recess are not limited to being each a smoothly curved recess, or each being a bended recess formed by a plurality of planes. In other embodiments not illustrated herein, the first recess may be a smoothly curved recess, whereas the second recess may be a bended recess formed by a plurality of planes. Alternatively, the first recess may be a bended recess formed by a plurality of planes, whereas the second recess may be a smoothly curved recess. Thus, the first recess and the second recess may be adjusted according to actual circumstances.

Figure 6:
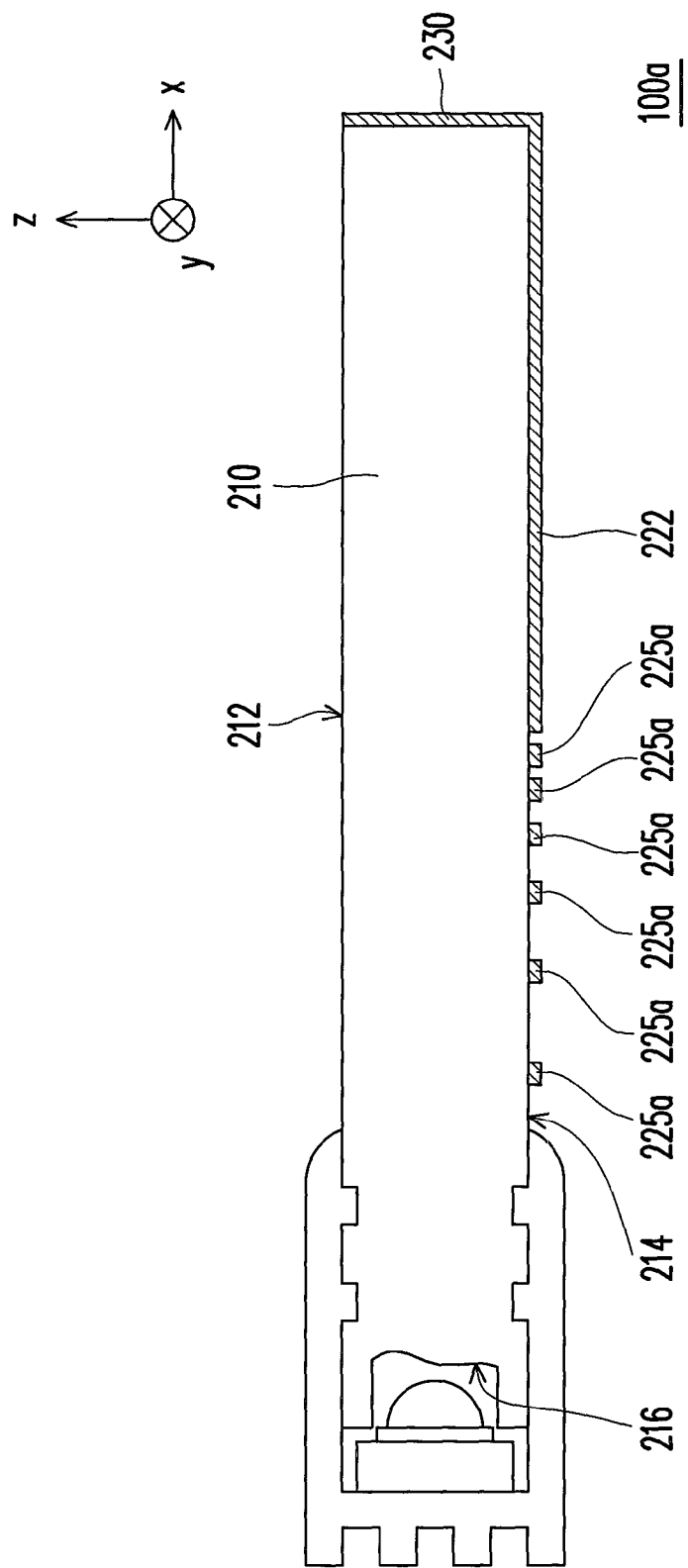
FIG. 6 is a schematic cross-sectional view of a light source module according to another embodiment of the invention.

FIG. 6 is a schematic cross-sectional view of a light source module according to another embodiment of the invention. Referring to FIG. 6, a light source module 100a according to the embodiment is similar to the light source module 100 depicted in FIG. 1A, and a difference between these two light source modules is described hereafter. In the embodiment, a number density of a plurality of scattering reflective patterns 225a progressively increases from near the light incident surface 216 to away from the light incident surface 216. According to this design, a surface light source near the light incident surface 216 has a preferable uniformity. In the embodiment, an area of each of the scattering reflective patterns 225a is substantially the same. However, in other embodiments of the invention, the area of each of the scattering reflective patterns 225a is all unequal or partially not equal.

Figure 7:
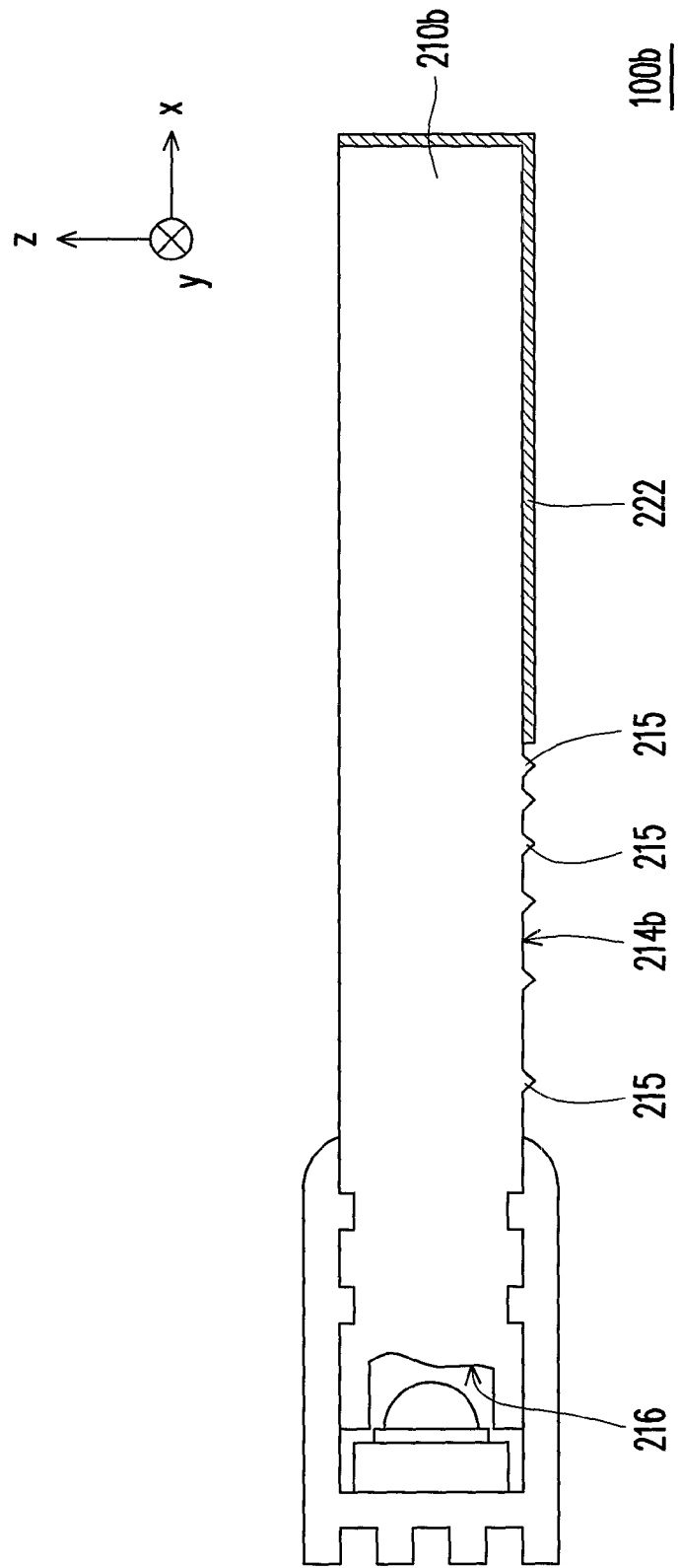
FIG. 7 is a schematic cross-sectional view of a light source module according to yet another embodiment of the invention.

FIG. 7 is a schematic cross-sectional view of a light source module according to yet another embodiment of the invention. Referring to FIG. 7, a light source module 100b according to the embodiment is similar to the light source module 100 depicted in FIG. 1A, and a difference between these two light source modules is described hereafter. In the embodiment, a second surface 214b of the light guide plate 210b has a plurality of surface optical structures 215 disposed between an end of the second surface 214b near the light incident surface 216 and the continuous scattering reflective layer 222. In the embodiment, the surface optical structures 215 are, for example, strip V-shaped protrusions extended along the y-direction. However, in other embodiments, the surface optical structures 215 may be protrusions or recesses of other shapes. In the embodiment, since the surface optical structures 215 extend along the y-direction, the light source module 100b may be manufactured by the afore-described double extrusion molding process, and therefore the light source module 100b of the embodiment may be easily manufactured. Moreover, a number density of the surface optical structures 215 may progressively increase from near the light incident surface 216 to away from the light incident surface 216. According to this design, a surface light source near the light incident surface 216 has a preferable uniformity.

In view of the foregoing, the embodiments of the invention may achieve at least one of the following advantages. In the light guide unit and the light source module according to embodiments of the invention, the light incident surface of the light guide plate includes a first recess and a second recess arranged in a sequence from the first surface to the second surface. Moreover, the average radius of curvature of the first recess is less than the average radius of curvature of the second recess. Further, with the scattering reflective unit added, the light guide unit may uniformly guide an incident light outwards. As such, the light source module may provide a uniform surface light source. Therefore, the light guide unit and the light source module according to the embodiments of the invention do not require an overly complex optical distribution design in order to achieve a preferable optical effect. Accordingly, the light guide unit and the light source module have a lower manufacturing cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light guide unit, comprising:
a light guide plate having a first surface, a second surface opposite to the first surface, and a light incident surface connecting the first surface and the second surface, wherein the light incident surface comprises a first recess and a second recess arranged in a sequence from the first surface to the second surface, and an average radius of curvature of the first recess is less than an average radius of curvature of the second recess, wherein the first recess comprises:
a first portion disposed between the first surface and a first reference plane, wherein a distance from the first reference plane to the first surface divided by a distance from the first reference plane to the second surface is substantially equal to $\frac{1}{3}$; and
a second portion disposed between the first reference plane and a second reference plane, wherein a distance from the second reference plane to the first surface divided by a distance from the second reference plane to the second surface is substantially equal to 1, and the second recess comprises:

a third portion disposed between the second reference plane and a third reference plane, wherein a distance from the third reference plane to the first surface divided by a distance from the third reference plane to the second surface is substantially equal to 3; and a fourth portion disposed between the third reference plane and the second surface, wherein the first reference plane, the second reference plane, and the third reference plane are substantially parallel to the first surface, and an average radius of curvature of the first portion is less than an average radius of curvature of the second portion, the average radius of curvature of the second portion is less than an average radius of curvature of the third portion, and the average radius of curvature of the third portion is less than an average radius of curvature of the fourth portion, wherein the first recess is asymmetrical on a direction perpendicular to the first surface, and the second recess is asymmetrical on the direction perpendicular to the first surface; and a scattering reflective unit disposed on the second surface.

2. The light guide unit as claimed in claim 1, wherein the first recess and the second recess are each a strip-shaped groove extending along a direction substantially parallel to the second surface.

3. The light guide unit as claimed in claim 1, wherein the scattering reflective unit comprises a continuous scattering reflective layer.

4. The light guide unit as claimed in claim 3, wherein the scattering reflective unit further comprises a patterned scattering reflective layer disposed between an end of the second surface near the light incident surface and the continuous scattering reflective layer, and comprising a plurality of scattering reflective patterns separated from each other, wherein an area of the scattering reflective patterns progressively increases from near the light incident surface to away from the light incident surface.

5. The light guide unit as claimed in claim 3, wherein the scattering reflective unit further comprises a patterned scattering reflective layer disposed between an end of the second surface near the light incident surface and the continuous scattering reflective layer, and comprising a plurality of scattering reflective patterns separated from each other, wherein a number density of the scattering reflective patterns progressively increases from near the light incident surface to away from the light incident surface.

6. The light guide unit as claimed in claim 3, wherein the second surface has a plurality of surface optical structures disposed between an end of the second surface near the light incident surface and the continuous scattering reflective layer.

7. The light guide unit as claimed in claim 1, wherein the light guide plate further comprises:

a third surface connecting the first surface and the second surface, wherein the third surface is opposite to the light incident surface;

a fourth surface connecting the first surface and the second surface, wherein the fourth surface connects the light incident surface and the third surface; and a fifth surface connecting the first surface and the second surface, wherein the fifth surface connects the light incident surface and the third surface, and the fifth surface is opposite to the fourth surface; and the light guide unit further comprises at least one reflective unit disposed on at least one of the third surface, the fourth surface, and the fifth surface.

8. The light guide unit as claimed in claim 7, wherein the reflective unit is a mirror reflective layer or a scattering reflective layer.

9. The light guide unit as claimed in claim 1, wherein the first recess and the second recess are each a smoothly curved recess, or each a bended recess formed by a plurality of planes, or one of the first recess and the second recess is a smoothly curved recess, and the other is a bended recess formed by a plurality of planes.

10. A light source module, comprising:

a light guide unit, comprising:

a light guide plate having a first surface, a second surface opposite to the first surface, and a light incident surface connecting the first surface and the second surface, wherein the light incident surface comprises a first recess and a second recess arranged in a sequence from the first surface to the second surface, and an average radius of curvature of the first recess is less than an average radius of curvature of the second recess, wherein the first recess comprises:

a first portion disposed between the first surface and a first reference plane, wherein a distance from the first reference plane to the first surface divided by a distance from the first reference plane to the second surface is substantially equal to $\frac{1}{3}$; and a second portion disposed between the first reference plane and a second reference plane, wherein a distance from the second reference plane to the first surface divided by a distance from the second reference plane to the second surface is substantially equal to 1, and the second recess comprises:

a third portion disposed between the second reference plane and a third reference plane, wherein a distance from the third reference plane to the first surface divided by a distance from the third reference plane to the second surface is substantially equal to 3; and a fourth portion disposed between the third reference plane and the second surface, wherein the first reference plane, the second reference plane, and the third reference plane are substantially parallel to the first surface, and an average radius of curvature of the first portion is less than an average radius of curvature of the second portion, the average radius of curvature of the second portion is less than an average radius of curvature of the third portion, and the average radius of curvature of the third portion is less than an average radius of curvature of the fourth portion; and a scattering reflective unit disposed on the second surface; and at least one light emitting device disposed beside the light incident surface and capable of emitting a light beam, wherein the light beam enters the light guide unit through the light incident surface, and the light beam is transmitted out of the light guide unit through the first surface.

11. The light source module as claimed in claim 10, wherein the first recess and the second recess are each a strip-shaped groove extending along a direction substantially parallel to the second surface.

12. The light source module as claimed in claim 10, wherein the light emitting device has an optical axis, and the optical axis and the second reference plane substantially overlap each other.

13. The light source module as claimed in claim 10, wherein the scattering reflective unit comprises a continuous scattering reflective layer.

14. The light source module as claimed in claim 13, wherein the scattering reflective unit further comprises a patterned scattering reflective layer disposed between an end of the second surface near the light incident surface and the continuous scattering reflective layer, and comprising a plurality of scattering reflective patterns separated from each other, wherein an area of the scattering reflective patterns progressively increases from near the light incident surface to away from the light incident surface.

15. The light source module as claimed in claim 13, wherein the scattering reflective unit further comprises a patterned scattering reflective layer disposed between an end of the second surface near the light incident surface and the continuous scattering reflective layer, and comprising a plurality of scattering reflective patterns separated from each other, wherein a number density of the scattering reflective patterns progressively increases from near the light incident surface to away from the light incident surface.

16. The light source module as claimed in claim 13, wherein the second surface has a plurality of surface optical structures disposed between an end of the second surface near the light incident surface and the continuous scattering reflective layer.

17. The light source module as claimed in claim 10, wherein the light guide plate further comprises:
 a third surface connecting the first surface and the second surface, wherein the third surface is opposite to the light incident surface;
 a fourth surface connecting the first surface and the second surface, wherein the fourth surface connects the light incident surface and the third surface;
 a fifth surface connecting the first surface and the second surface, wherein the fifth surface connects the light incident surface and the third surface, and the fifth surface is opposite to the fourth surface; and
 at least one reflective unit disposed on at least one of the third surface, the fourth surface, and the fifth surface.

18. The light source module as claimed in claim 10, wherein the light guide plate comprises:
 a first protruding portion disposed on an intersection of the first surface and the first recess; and
 a second protruding portion disposed on an intersection of the second surface and the second recess, wherein the first protruding portion, the first recess, the second recess, and the second protruding portion form an accommodating space for accommodating the light emitting device.

19. The light source module as claimed in claim 18, further comprising a lampshade covering the light emitting device, a portion of the first surface near the light incident surface, the light incident surface, and a portion of the second surface near the light incident surface, wherein at least one of the first surface and the second surface has at least one first engaging structure thereon, and an extended direction of the first engaging structure is substantially parallel to the extended direction of the light incident surface, the lampshade has at least one second engaging structure corresponding to the first engaging structure, an extended direction of the second engaging structure is substantially parallel to the extended direction of the light incident surface, and the second engaging structure and the first engaging structure engage with each other.

20. A light source module, comprising:
 a light guide unit, comprising:
  a light guide plate having a first surface, a second surface opposite to the first surface, and a light incident surface connecting the first surface and the second surface, wherein the light incident surface comprises a first recess and a second recess arranged in a sequence from the first surface to the second surface, and an average radius of curvature of the first recess is less than an average radius of curvature of the second recess, wherein the light guide plate comprises:
   a first protruding portion disposed on an intersection of the first surface and the first recess; and
   a second protruding portion disposed on an intersection of the second surface and the second recess, wherein the first protruding portion, the first recess, the second recess, and the second protruding portion form an accommodating space for accommodating the light emitting device; and
  a scattering reflective unit disposed on the second surface; and
 at least one light emitting device disposed beside the light incident surface and capable of emitting a light beam, wherein the light beam enters the light guide unit through the light incident surface, and the light beam is transmitted out of the light guide unit through the first surface.

* * * * *